UNITED STATES PATENT OFFICE.

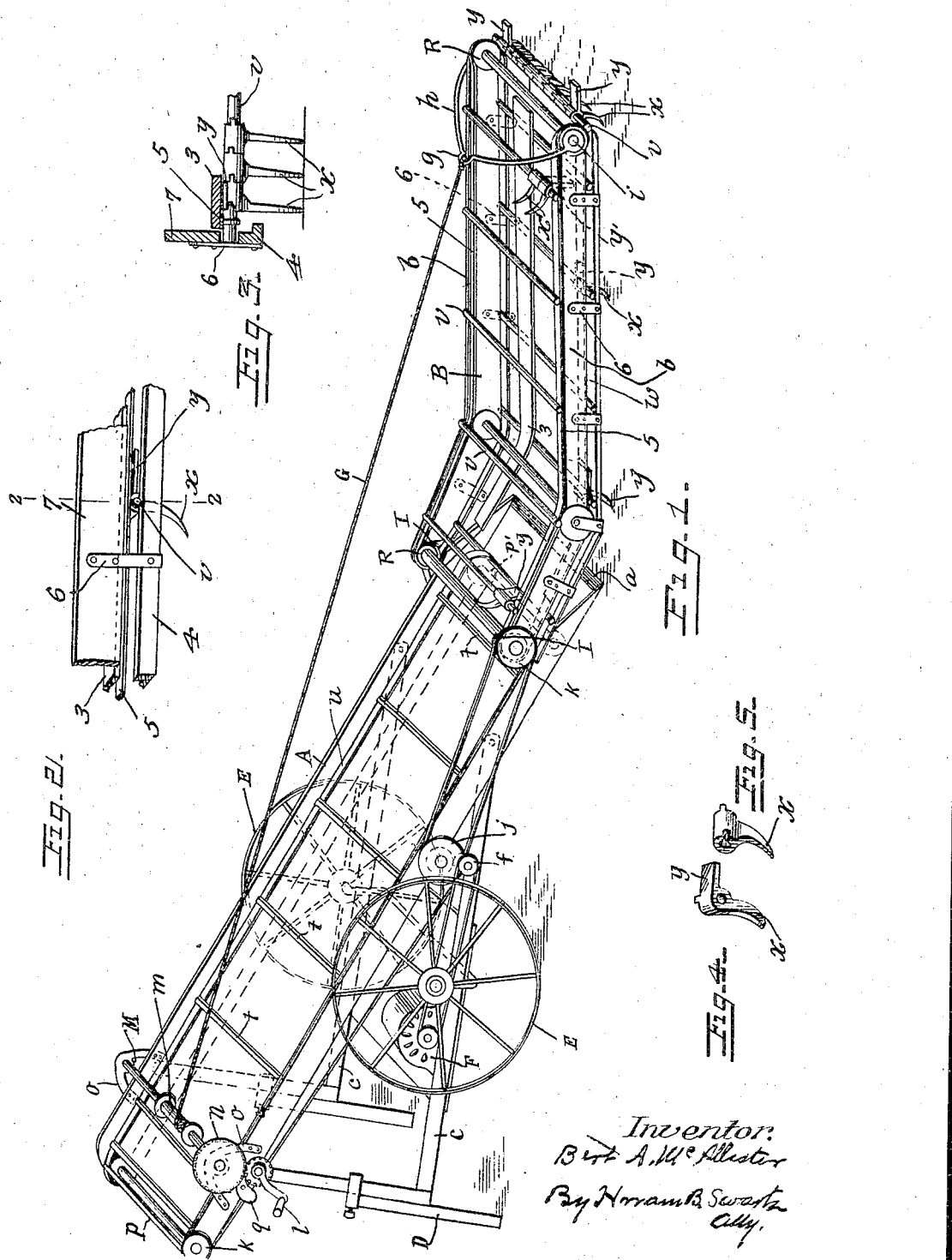

BERT A. McALLISTER, OF WADSWORTH, OHIO.

MANURE LOADER.

1,420,118.   Specification of Letters Patent.   Patented June 20, 1922.

Application filed April 22, 1921. Serial No. 463,611.

*To all whom it may concern:*

Be it known that I, BERT A. MCALLISTER, a citizen of the United States, residing at Wadsworth, in the county of Medina, and State of Ohio, have invented a new and useful Manure Loader, of which the following is a specification.

My invention relates to devices for loading manure and the like on vehicles; and its primary object is to provide a simple and adequate means for gathering manure and debris from where it may be deposited, and thence conveying the same to some vehicle adjacent thereto for transportation.

It consists principally in combining with a movable conveyor mounted on wheels, and driven by a suitable motor, a platform hinged to the frame of said conveyor, and provided with a series of forks or teeth mounted to travel over the under surface of the platform in operative engagement with said conveyor, to deliver the gathered manure or other debris substance thereto all as hereinafter fully set forth, and stated in the appended claims.

My invention is illustrated by the accompanying drawings in which similar letters and figures of reference indicate like parts.

Referring thereto, Fig. 1 is a perspective view of a manure loader embodying my invention; Fig. 2 is a detail view of a section of one side of my manure gathering platform, enlarged; and Fig. 3 is a detail view in cross section of Fig. 2 on the dotted line 2—2. Figs. 4 and 5 are detail view of forks, detached.

In the drawings, A is a movable conveyor mounted on wheels E E, carrying a framework C, on which is mounted a suitable motor F, such as are in common use. D is a shiftable standard, slidably secured to a vertical member of the frame C, whereby the rear end of the conveyor A is supported at rest in any desired position. B is a platform, having parallel sides $b$ $b$, which are hinged at their lower ends respectively to the standards I I, at points a little distance above the lower end of the conveyor frame A, said platform sides being bent upwardly near their junction with said standards in order to permit the platform to take a flatwise position when desired. Said platform is further provided with a pair of end rollers R R on which are mounted belts or chains 5 5, carrying the series of cross rods $v$ $v$; and to the latter are pivotally secured a plurality of forks or teeth $x$ $x$, adapted to travel with the movement of said belts around said platform endwise, whereby the manure underneath the platform is gathered and carried into the open lower end of the conveyor frame A.

At this point it is essential that said teeth be capable of being tripped so as to discharge their load on said conveyor; and, to accomplish this, periodically, I construct said teeth with a tail piece $y$, and adapt the latter to travel slidably over the under surface of a rail 3, (Fig. 2) secured against the inside of the platform sides $b$ $b$, and the supporting rods $v$ $v$, on which said teeth are independently pivoted, extend laterally into a guide-way $w$, which is formed by suspending an angle bar 4 at a little distance below the lower edge of the sides $b$ $b$, by means of the straps 6 6.

To accomplish the tripping of the teeth, the rail 3 is made to terminate at a point near the lower terminus of the platform sides, whereby the said tail piece $y$ is permitted to turn upwardly as shown at $y'$, and so discharge the manure from the teeth, the latter being withdrawn as the cross rods $v$ travel over the platform. Said teeth may be made either singly or a plurality of the same may be solidly connected and pivotally mounted on said rods so as to be unitedly controlled by a common tail piece; and said teeth may be distributed regularly, or in staggered position over the platform, as may be preferred. They are shown in tripped position at $x'$ in Fig. 1. The lower end of the elevator frame, $a$, is preferably metal edged, and extends a little distance underneath the adjacent end of the manure gathering platform.

Conveyor mechanism is provided by means of transverse bars $t$ $t$, secured endwise upon belts or chains $u$ $u$, and travels over end rollers $p$ $p'$ in the usual and well known way of conveyors for similar uses, and no claim is made specifically thereto. It is driven by the motor F by either belt or chain gear, in unison with the mechanism for conveying the cross rods and teeth thereon, by suitable gear wheels $f$, $j$ and $k$. Other equivalent means for actuating the conveyors may be employed.

For conveniently shifting or transporting the entire machine, and particularly, as a means for engaging manure piles and the like at different elevations, I provide for shifting the outer end of the platform B vertically, by means of a cable G attached thereto by the lift bar h to which the cable is attached at g, its opposite end being wound upon the windlass m, mounted upon standards o o, and operable by a hand crank l, gear wheels n, and pawl q; and the platform B may thus be folded over and upon the elevator platform A.

I am aware it is not new to construct conveyors with gathering mechanism movable thereon upwardly and rearwardly over the upper surface of the conveyor platform, and such I do not broadly claim.

In my invention the gathering mechanism moves forwardly instead of rearwardly over the upper surface of the manure gathering platform, and during such movement the teeth or prongs of the conveyor remain inoperative, and for gathering manure the gathering mechanism moves rearwardly over the under surface of the platform, and the conveyor teeth or prongs during such movement are set rigidly so as to point downwardly and rearwardly, so as to gather and convey the manure underneath the platform and deliver it to the lower end of the elevator platform as the gathered manure emerges from beneath the gathering platform, and my claims herein are limited to the means set forth for gathering manure underneath the manure gathering platform, and for tripping the teeth or prongs at a point under the lower end of the platform, and for conveying them on cross-rods which are movable along guideways under the platform sides, respectively, in rearward direction, and along and upon the upper edges of the sides, respectively, in the opposite direction, substantially as shown.

I do not limit my invention to mere matters of form, but having thus fully described it, what I claim as new, and desire to secure by Letters Patent, is—

1. In a device of the character described, the combination with an elevator platform, and elevator mechanism operable thereon, of a manure gathering platform hinged to the lower end of the elevator platform, a manure gathering mechanism adapted to travel endwise rearwardly underneath the manure gathering platform to the adjacent end of the elevator platform, longitudinal guideways underneath the manure gathering platform along the sides thereof, respectively, a series of cross-rods having end projections fitted to travel in said guideways, respectively underneath said platform, in the direction of the elevator platform, longitudinal rails along the under surface of the manure gathering platform adjacent to the guideways respectively, a series of teeth or prongs pivotally mounted on the cross-rods, respectively, tail pieces projecting rearwardly from the prongs travelling underneath said rails, respectively, said rails terminating at or near the junction of said platforms, said cross-rods mounted on endless belting adapted to travel over and under said platform, and means for propelling said travelling mechanisms simultaneously, substantially as set forth, and for the purpose specified.

2. In a device of the character described, the combination with an elevator platform, elevator mechanism operable thereon; of a manure gathering platform hinged to said elevator platform; a plurality of rods spaced apart across said manure gathering platform, guideways adapted to receive the extended ends of said rods so as to travel in said guideways underneath the manure gathering platform; means for connecting and actuating said rods over said platform; a plurality of toothed members pivotally attached to said rods, respectively; means for tripping said toothed members underneath the hinged end of the said platform, and means, including a motor, for actuating said traveling mechanisms simultaneously, substantially as set forth.

3. In a device of the character described, in combination with a hinged platform having side rails; transverse rods mounted to travel underneath said rails; of a plurality of toothed members pivotally secured to said rods, respectively, said toothed members having tail pieces connected thereto, respectively, longitudinal rails under said platform terminating below the hinged end thereof, and means for tripping said teeth by the action of said tail pieces at the termini of said rails, respectively, substantially as set forth and for the purpose specified.

In witness whereof, I hereunto set my hand this 7" day of October, 1920.

BERT A. McALLISTER.

In presence of two witnesses—
Hiram B. Swartz,
R. C. Yost.